(12) United States Patent
Komatsu et al.

(10) Patent No.: US 10,525,768 B2
(45) Date of Patent: Jan. 7, 2020

(54) BICYCLE HUB ASSEMBLY (71) Applicant: SHIMANO INC., Sakai (JP)

(72) Inventors: Atsushi Komatsu, Sakai (JP); Koji Yuasa, Sakai (JP); Takehiko Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 175 days.

(21) Appl. No.: 15/799,997

(22) Filed: Oct. 31, 2017

(65) Prior Publication Data
US 2019/0126679 A1   May 2, 2019

(51) Int. Cl.
*B60B 27/04* (2006.01)
*B62M 9/10* (2006.01)
*F16H 55/30* (2006.01)

(52) U.S. Cl.
CPC ............... *B60B 27/04* (2013.01); *B62M 9/10* (2013.01); *F16H 55/30* (2013.01)

(58) Field of Classification Search
CPC ...................................................... B62M 9/10
USPC .......................................................... 301/110
See application file for complete search history.

(56) References Cited

U.S. PATENT DOCUMENTS

| | | | | |
|---|---|---|---|---|
| 6,644,652 B1 * | 11/2003 | Walsh | ................. | G03G 15/234 271/176 |
| 8,820,852 B2 * | 9/2014 | Van Hoek | ................. | F16H 7/20 301/110.5 |
| 8,864,243 B2 * | 10/2014 | Beyfuss | ................. | F16C 19/184 301/110 |
| 9,855,794 B1 * | 1/2018 | Nakajima | ............. | B60B 27/023 |
| 2010/0260544 A1 * | 10/2010 | Chiang | ................. | B60B 27/023 403/359.1 |
| 2014/0265539 A1 * | 9/2014 | Thompson | ............ | B60B 27/023 301/110.5 |
| 2016/0200395 A1 | 7/2016 | Braedt | | |

* cited by examiner

*Primary Examiner* — S. Joseph Morano
*Assistant Examiner* — Jean W Charleston
(74) *Attorney, Agent, or Firm* — Mori & Ward, LLP (57) ABSTRACT A bicycle hub assembly comprises a hub axle, a hub body, and a sprocket support structure. The hub axle includes an axle through-bore that has an axle minimum inner diameter equal to or larger than 13 mm. The hub body has a first body end and a second body end opposite to the first body end in an axial direction with respect to a rotational center axis. The sprocket support structure is rotatably mounted on the hub axle about the rotational center axis. The sprocket support structure includes a first torque-transmitting profile and a first externally-threaded portion. The first torque-transmitting profile is configured to transmit a rotational force. The first externally-threaded portion is configured to threadedly engage with a first internally-threaded portion of a first lock member. The first torque-transmitting profile is closer to the first body end than the first externally-threaded portion in the axial direction.

23 Claims, 8 Drawing Sheets

BICYCLE HUB ASSEMBLY

BACKGROUND OF THE INVENTION

Field of the Invention

The present invention relates to a bicycle hub assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a hub assembly.

SUMMARY OF THE INVENTION

In accordance with a first aspect of the present invention, a bicycle hub assembly comprises a hub axle, a hub body, and a sprocket support structure. The hub axle includes an axle through-bore that has an axle minimum inner diameter equal to or larger than 13 mm. The hub body is rotatably supported on the hub axle about a rotational center axis of the bicycle hub assembly. The hub body has a first body end and a second body end opposite to the first body end in an axial direction with respect to the rotational center axis. The sprocket support structure is rotatably mounted on the hub axle about the rotational center axis of the bicycle hub assembly. The sprocket support structure includes a first torque-transmitting profile and a first externally-threaded portion. The first torque-transmitting profile is configured to transmit a rotational force between the sprocket support structure and a bicycle sprocket assembly. The first externally-threaded portion is configured to threadedly engage with a first internally-threaded portion of a first lock member. The first torque-transmitting profile is closer to the first body end than the first externally-threaded portion in the axial direction.

With the bicycle hub assembly according to the first aspect, it is possible to mount the bicycle sprocket assembly having a wider gear range to the bicycle hub assembly using the first torque-transmitting profile and the first externally-threaded portion with suppressing enlargement of the bicycle hub assembly. Furthermore, the axle minimum inner diameter allows a wheel securing shaft having a larger outer diameter to extend through the axle-through bore of the hub axle, improving strength of the wheel securing shaft.

In accordance with a second aspect of the present invention, the bicycle hub assembly according to the first aspect is configured to so that the first torque-transmitting profile includes at least one external spline tooth configured to engage with an internal spline tooth of the bicycle sprocket assembly. The at least one external spline tooth has an external-spline major diameter that is larger than the axle minimum inner diameter of the axle through-bore. A difference between the external-spline major diameter and the axle minimum inner diameter is equal to or smaller than 22 mm.

With the bicycle hub assembly according to the second aspect, it is possible to further improve the strength of the wheel securing shaft with suppressing enlargement of the bicycle hub assembly.

In accordance with a third aspect of the present invention, the bicycle hub assembly according to the second aspect is configured so that the difference between the external-spline major diameter and the axle minimum inner diameter is equal to or smaller than 21 mm.

With the bicycle hub assembly according to the third aspect, it is possible to further improve the strength of the wheel securing shaft with suppressing enlargement of the bicycle hub assembly.

In accordance with a fourth aspect of the present invention, the bicycle hub assembly according to the second aspect is configured so that the difference between the external-spline major diameter and the axle minimum inner diameter is equal to or larger than 13 mm.

With the bicycle hub assembly according to the fourth aspect, it is possible to ensure strength of the at least one external spline tooth of the first torque-transmitting profile.

In accordance with a fifth aspect of the present invention, the bicycle hub assembly according to any one of the first to fourth aspects is configured so that the first torque-transmitting profile includes at least one external spline tooth configured to engage with an internal spline tooth of the bicycle sprocket assembly. The at least one external spline tooth has an external-spline minor diameter that is larger than the axle minimum inner diameter of the axle through-bore. A difference between the external-spline minor diameter and the axle minimum inner diameter is equal to or smaller than 20 mm.

With the bicycle hub assembly according to the fifth aspect, it is possible to further improve the strength of the wheel securing shaft with suppressing enlargement of the bicycle hub assembly.

In accordance with a sixth aspect of the present invention, the bicycle hub assembly according to the fifth aspect is configured so that the difference between the external-spline minor diameter and the axle minimum inner diameter is equal to or smaller than 19 mm.

With the bicycle hub assembly according to the sixth aspect, it is possible to further improve the strength of the wheel securing shaft with suppressing enlargement of the bicycle hub assembly.

In accordance with a seventh aspect of the present invention, the bicycle hub assembly according to the fifth aspect is configured so that the difference between the external-spline minor diameter and the axle minimum inner diameter is equal to or larger than 12 mm.

With the bicycle hub assembly according to the seventh aspect, it is possible to ensure the strength of the at least one external spline tooth of the first torque-transmitting profile.

In accordance with an eighth aspect of the present invention, the bicycle hub assembly according to any one of the first to seventh aspects is configured so that the first externally-threaded portion has a first externally-threaded major diameter that is larger than the axle minimum inner diameter. A difference between the first externally-threaded major diameter and the axle minimum inner diameter is equal to or smaller than 19 mm.

With the bicycle hub assembly according to the eighth aspect, it is possible to further improve the strength of the wheel securing shaft with suppressing enlargement of the bicycle hub assembly.

In accordance with a ninth aspect of the present invention, the bicycle hub assembly according the eighth aspect is configured so that the difference between the first externally-threaded major diameter and the axle minimum inner diameter is equal to or smaller than 18 mm.

With the bicycle hub assembly according to the ninth aspect, it is possible to further improve the strength of the wheel securing shaft with suppressing enlargement of the bicycle hub assembly.

In accordance with a tenth aspect of the present invention, the bicycle hub assembly according to the eighth aspect is configured so that the difference between the first externally-threaded major diameter and the axle minimum inner diameter is equal to or larger than 11 mm.

With the bicycle hub assembly according to the tenth aspect, it is possible to ensure strength of the first externally-threaded portion of the sprocket support structure.

In accordance with an eleventh aspect of the present invention, the bicycle hub assembly according to any one of the first to tenth aspects is configured so that the sprocket support structure has a support minimum outer diameter that is larger than the axle minimum inner diameter of the axle through-bore. The difference between the support minimum outer diameter and the axle minimum inner diameter is equal to or smaller than 15 mm.

With the bicycle hub assembly according to the eleventh aspect, it is possible to mount a sprocket having a smaller inner diameter on the sprocket support structure of the bicycle hub assembly.

In accordance with a twelfth aspect of the present invention, the bicycle hub assembly according to the eleventh aspect is configured so that the difference between the support minimum outer diameter and the axle minimum inner diameter is equal to or smaller than 14 mm.

With the bicycle hub assembly according to the twelfth aspect, it is possible to mount a sprocket having a smaller inner diameter to sprocket support structure of the bicycle hub assembly.

In accordance with a thirteenth aspect of the present invention, the bicycle hub assembly according to the eleventh aspect is configured so that the difference between the support minimum outer diameter and the axle minimum inner diameter is equal to or larger than 7 mm.

With the bicycle hub assembly according to the thirteenth aspect, it is possible to ensure strength of the sprocket support structure of the bicycle hub assembly.

In accordance with a fourteenth aspect of the present invention, the bicycle hub assembly according to any one of the first to thirteenth aspects further comprises a bearing provided between the sprocket support structure and the hub axle to support rotatably the sprocket support structure relative to the hub axle.

With the bicycle hub assembly according to the fourteenth aspect, the bearing enables the sprocket support structure to rotate about the rotational center axis relative to the hub axle more smoothly.

In accordance with a fifteenth aspect of the present invention, the bicycle hub assembly according to the fourteenth aspect is configured so that the hub axle includes an axle inner peripheral surface defining the axle through-bore. The bearing includes a plurality of rolling elements. The plurality of rolling elements is radially closer to the axle inner peripheral surface than to the first torque-transmitting profile.

With the bicycle hub assembly according to the fifteenth aspect, it is possible to make the bearing smaller.

In accordance with a sixteenth aspect of the present invention, the bicycle hub assembly according to any one of the first to fifteenth aspects is configured so that the axle minimum inner diameter of the axle through-bore is equal to or larger than 14 mm.

With the bicycle hub assembly according to the sixteenth aspect, it is possible to further improve the strength of the wheel securing shaft because the wheel securing shaft can have a larger outer diameter.

In accordance with a seventeenth aspect of the present invention, the bicycle hub assembly according to any one of the first to sixteenth aspects is configured so that the axle minimum inner diameter of the axle through-bore is equal to or smaller than 21 mm.

With the bicycle hub assembly according to the seventeenth aspect, it is possible to obtain a necessary internal space between the sprocket support structure and the hub axle and thereby to improve a degree of freedom of designing the bicycle hub assembly.

In accordance with an eighteenth aspect of the present invention, the bicycle hub assembly according to any one of the first to seventeenth aspects is configured so that the hub axle has an axle maximum outer diameter equal to or larger than 17 mm.

With the bicycle hub assembly according to the eighteenth aspect, it is possible to enlarge the axle minimum inner diameter of the axle through-bore of the hub axle so that the strength of the wheel securing shaft is improved.

In accordance with a nineteenth aspect of the present invention, the bicycle hub assembly according to the eighteenth aspects is configured so that the hub axle has an axle maximum outer diameter equal to or larger than 20 mm.

With the bicycle hub assembly according to the nineteenth aspect, it is possible further enlarge the axle minimum inner diameter of the axle through-bore of the hub axle so that the strength of the wheel securing shaft is improved.

In accordance with a twentieth aspect of the present invention, the bicycle hub assembly according to the eighteenth aspect is configured so that the axle maximum outer diameter of the hub axle is equal to or smaller than 23 mm.

With the bicycle hub assembly according to the twentieth aspect, it is possible to obtain a necessary internal space between the sprocket support structure and the hub axle and thereby to improve a degree of freedom of designing the bicycle hub assembly.

In accordance with a twenty-first aspect of the present invention, a bicycle drive train assembly comprises the bicycle hub assembly according to the first aspect, and the bicycle sprocket assembly. The sprocket support structure has a support maximum outer diameter. The bicycle sprocket assembly includes a first sprocket that has a first inner diameter smaller than the support maximum outer diameter of the hub axle.

With the bicycle drive train assembly according to the twenty-first aspect, the bicycle sprocket assembly can have a wider gear range.

In accordance with a twenty-second aspect of the present invention, the bicycle drive train assembly according to the twenty-first aspect is configured so that the sprocket support structure has a support minimum outer diameter. The first inner diameter of the first sprocket is smaller than the support minimum outer diameter.

With the bicycle drive train assembly according to the twenty-second aspect, the bicycle sprocket assembly can have a wider gear range.

In accordance with a twenty-third aspect of the present invention, the bicycle drive train assembly according to the twenty-first aspect is configured so that the bicycle sprocket assembly comprises a plurality of sprockets including the first sprocket. The first sprocket has a first pitch-circle diameter. The first pitch-circle diameter is the smallest pitch-circle diameter among the plurality of sprockets.

With the bicycle drive train assembly according to the twenty-third aspect, the bicycle sprocket assembly can have a wider gear range.

In accordance with a twenty-fourth aspect of the present invention, the bicycle drive train assembly according to the twenty-first aspect further comprises the first lock member configured to prevent an axial movement of the bicycle sprocket assembly relative to the sprocket support structure in a state where the first lock member is attached to the sprocket support structure. The first lock member includes the first internally-threaded portion to engage with the first externally-threaded portion.

With the bicycle drive train assembly according to the twenty-fourth aspect, it is possible to firmly secure the bicycle sprocket assembly to the sprocket support structure in the axial direction with the first lock member.

In accordance with a twenty-fifth aspect of the present invention, the bicycle drive train assembly according to the twenty-fourth aspect is configured so that the first lock member has a first axial end and a second axial end and extends between the first axial end and the second axial end in the axial direction. The first internally-threaded portion is provided between the first axial end and the first torque-transmitting profile in a state where the first internally-threaded portion is engaged with the first externally-threaded portion. A thickness of the first axial end ranges from 0.5 mm to 1.5 mm.

With the bicycle drive train assembly according to the twenty-fifth aspect, it is possible to suppress enlargement of the first lock member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiment(s) will now be described with reference to the accompanying drawings, wherein like reference numerals designate corresponding or identical elements throughout the various drawings.

Figure 1:
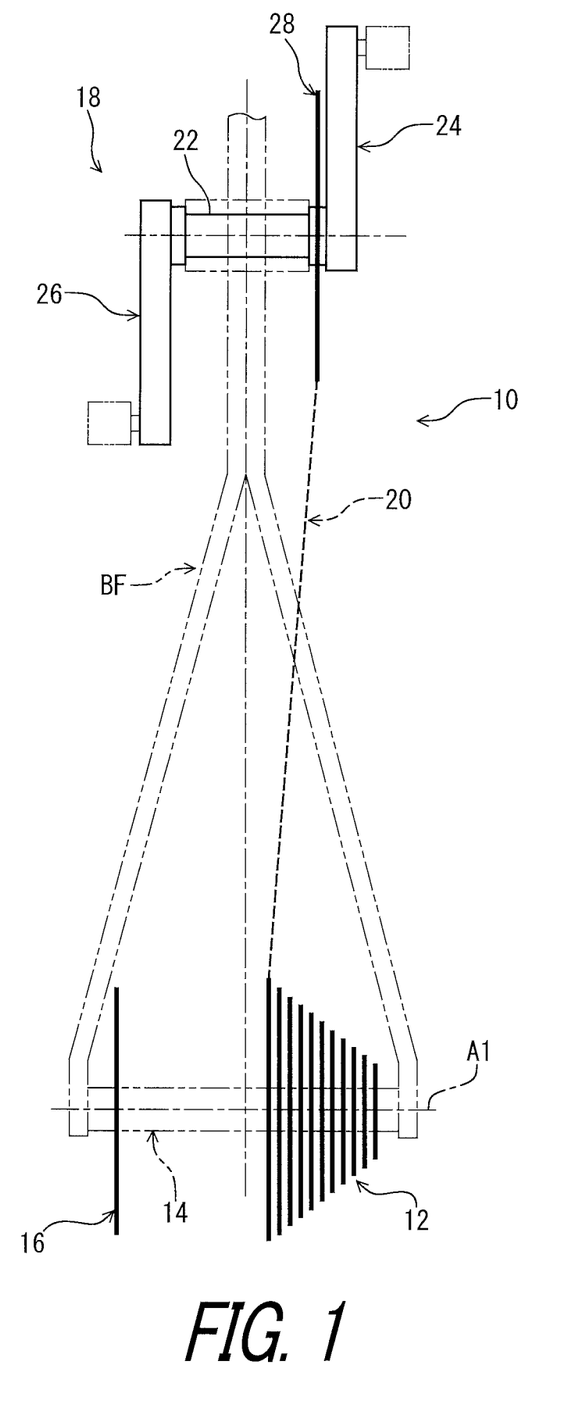
FIG. 1 is a schematic diagram of a bicycle drive train assembly in accordance with an embodiment.

Referring initially to FIG. 1, a bicycle drive train assembly 10 in accordance with an embodiment comprises a bicycle sprocket assembly 12, a bicycle hub assembly 14, and a brake rotor 16. The bicycle hub assembly 14 is secured to a bicycle frame BF. The bicycle sprocket assembly 12 is mounted on the bicycle hub assembly 14. The brake rotor 16 is mounted on the bicycle hub assembly 14. The bicycle drive train assembly 10 may further comprise a crank assembly 18 and a bicycle chain 20. The crank assembly 18 includes a crank axle 22, a right crank arm 24, a left crank arm 26, and a front sprocket 28. The right crank arm 24 and the left crank arm 26 are secured to the crank axle 22. The front sprocket 28 is secured to at least one of the crank axle 22 and the right crank arm 24. The bicycle chain 20 is engaged with the front sprocket 28 and the bicycle sprocket assembly 12 to transmit a pedaling force from the front sprocket 28 to the bicycle sprocket assembly 12. The crank assembly 18 includes the front sprocket 28 as a single sprocket. However, the crank assembly 18 can includes a plurality of front sprockets.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle (not shown) with facing a handlebar. Accordingly, these terms, as utilized to describe the bicycle drive train assembly 10, should be interpreted relative to the bicycle equipped with the bicycle drive train assembly 10 as used in an upright riding position on a horizontal surface.

Figure 2:
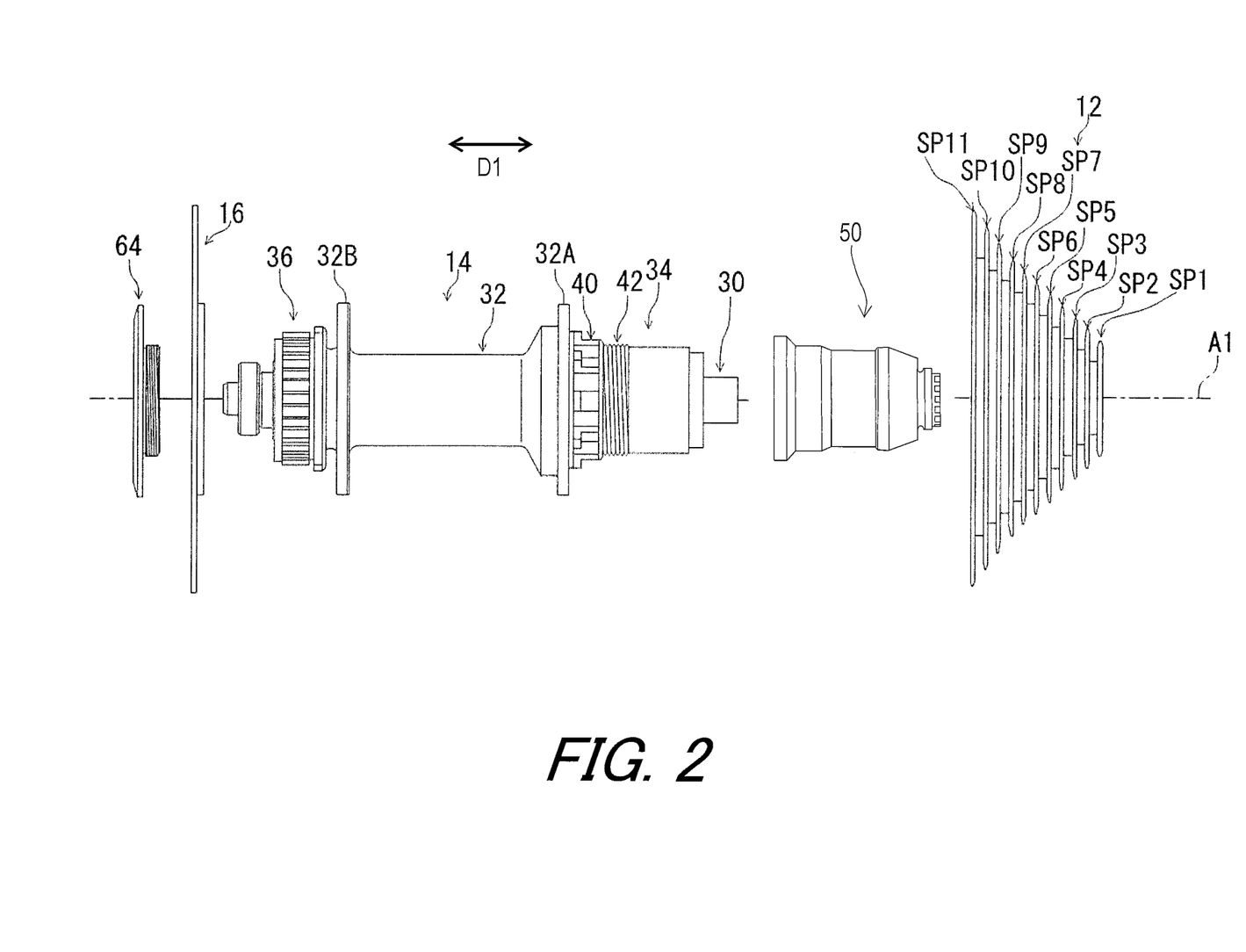
FIG. 2 is a rear view of the bicycle drive train assembly illustrated in FIG. 1.

As seen in FIG. 2, the bicycle sprocket assembly 12 includes a plurality of sprockets. The bicycle sprocket assembly 12 includes a first sprocket SP1 and an eleventh sprocket SP11. The first sprocket SP1 is the smallest sprocket among the plurality of sprockets. The eleventh sprocket SP 11 is the largest sprocket among the plurality of sprockets. The bicycle sprocket assembly 12 includes nine additional sprockets SP2 to SP10 disposed between the first sprocket SP1 and the eleventh sprocket SP11 in an axial direction D1 with respect to a rotational center axis A1 of the bicycle hub assembly 14. However, a total number of sprockets of the bicycle sprocket assembly 12 is not limited to this embodiment. The first sprocket SP1 and the eleventh sprocket SP11 can be referred to as sprockets SP1 and SP11, respectively. The additional sprockets SP2 to SP10 can also be referred to as sprockets SP2 to SP10, respectively.

As seen in FIG. 2, the bicycle hub assembly 14 comprises a hub axle 30, a hub body 32, a sprocket support structure 34, and a brake-rotor support structure 36. The hub body 32 is rotatably supported on the hub axle 30 about the rotational center axis A1 of the bicycle hub assembly 14. The hub body 32 has a first body end 32A and a second body end 32B. The second body end 32B is opposite to the first body end 32A in the axial direction D1 with respect to the rotational center axis A1. In this embodiment, the first body end 32A is a right end of the hub body 32, and the second body end 32B is a left end of the hub body 32. However, the first body end 32A can be a left end, and the second body end 32B can be a right end.

The sprocket support structure 34 is configured to support the bicycle sprocket assembly 12. The sprocket support structure 34 is closer to the first body end 32A than the brake-rotor support structure 36 in the axial direction D1. The sprocket support structure 34 is rotatably mounted on the hub axle 30 about the rotational center axis A1.

As seen in FIG. 2, the bicycle drive train assembly 10 further comprises a first lock member 50. The first lock member 50 is configured to prevent an axial movement of the bicycle sprocket assembly 12 relative to the sprocket support structure 34 in a state where the first lock member 50 is attached to the sprocket support structure 34. The first lock member 50 is provided between the sprocket support structure 34 and the sprockets SP2 to SP 10 in a radial direction with respect to the rotational center axis A1.

As seen in FIG. 2, the brake-rotor support structure 36 is configured to support the brake rotor 16. The brake-rotor support structure 36 is provided at the second body end 32B. The brake-rotor support structure 36 is rotatably mounted on the hub axle 30 about the rotational center axis A1. The brake-rotor support structure 36 is coupled to the hub body 32 to rotate integrally with the hub body 32 relative to the hub axle 30 about the rotational center axis A1. In this embodiment, the brake-rotor support structure 36 is integrally provided with the hub body 32 as a one-piece unitary member. However, the brake-rotor support structure 36 can be a separate member from the hub body 32.

Figure 3:
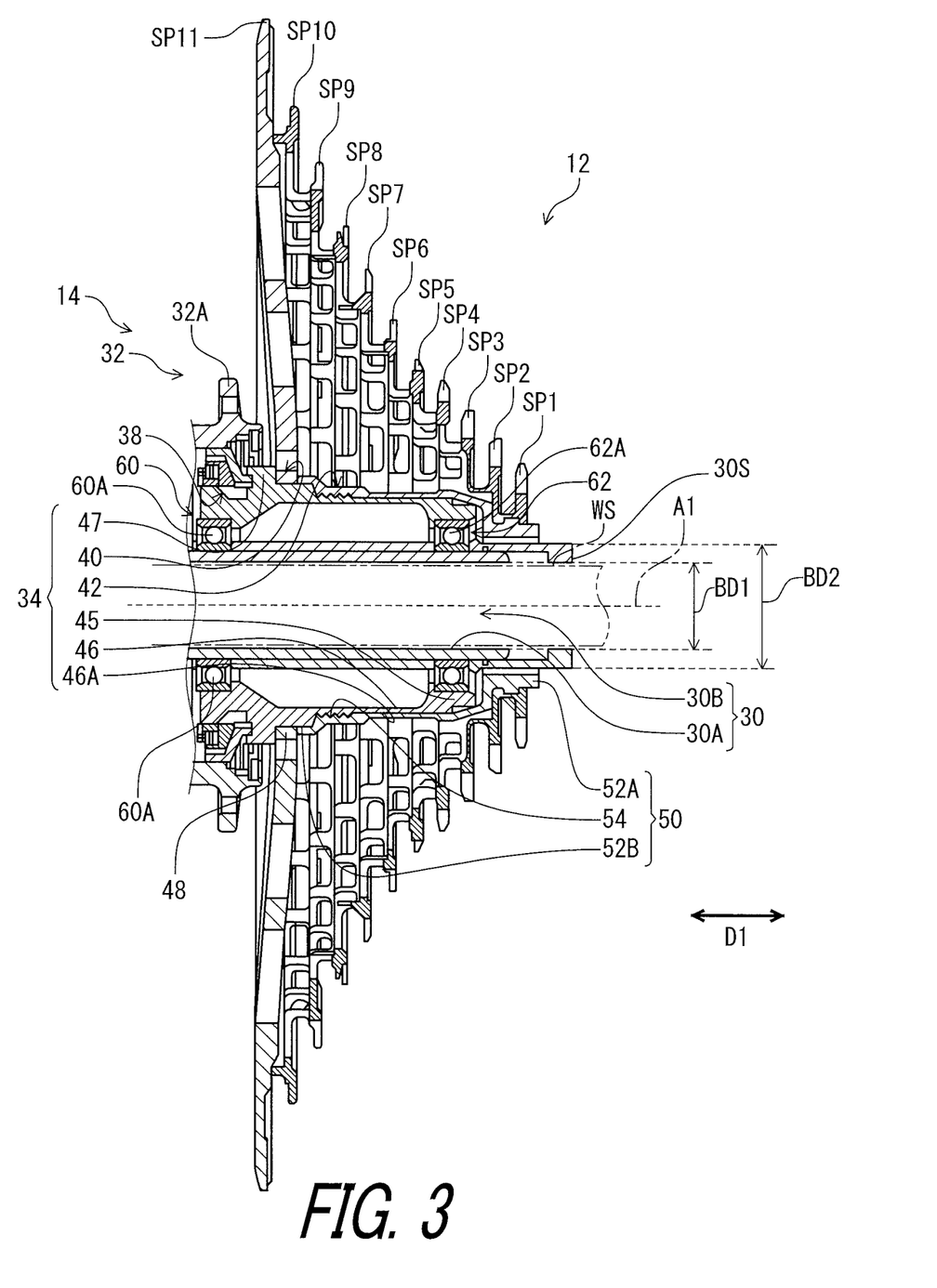
FIG. 3 is a cross-sectional view of a bicycle hub assembly, a bicycle sprocket assembly, and a first lock member of the bicycle drive train assembly illustrated in FIG. 1.

As seen in FIG. 3, the hub axle 30 includes an axle inner peripheral surface 30A and an axle through-bore 30B. The axle inner peripheral surface 30A defines the axle through-bore 30B of the hub axle 30. A wheel securing shaft WS is configured to extend through the axle through-bore 30B to secure the bicycle hub assembly 14 to the bicycle frame BF (FIG. 1).

As seen in FIG. 3, the bicycle hub assembly 14 comprises a bearing 60. The bearing 60 is provided between the sprocket support structure 34 and the hub axle 30 in the radial direction with respect to the rotational center axis A1. The bearing 60 is configured to support rotatably the sprocket support structure 34 relative to the hub axle 30. The bearing 60 includes a plurality of rolling elements 60A. The plurality of rolling elements 60A is rotatable along an outer peripheral surface of the hub axle 30 about the rotational center axis A1.

Similarly, the bicycle hub assembly 14 comprises a bearing 62. The bearing 62 is provided between the sprocket support structure 34 and the hub axle 30 in the radial direction with respect to the rotational center axis A1. The bearing 62 is configured to support rotatably the sprocket support structure 34 relative to the hub axle 30. The bearing 62 includes a plurality of rolling elements 62A. The plurality of rolling elements 62A is rotatable along the outer peripheral surface of the hub axle 30 about the rotational center axis A1. Namely, the bicycle hub assembly 14 in this embodiment comprises two bearings. However, the number of the bearings is not limited to this embodiment.

The sprocket support structure 34 is a separate member from the hub body 32. The bicycle hub assembly 14 comprises a ratchet structure 38. The sprocket support structure 34 is operatively coupled to the hub body 32 with the ratchet structure 38. The ratchet structure 38 is configured to couple the sprocket support structure 34 to the hub body 32 in one rotational direction to rotate the sprocket support structure 34 along with the hub body 32 during pedaling. The ratchet structure 38 is configured to allow the sprocket support structure 34 to rotate relative to the hub body 32 in the other rotational direction during coasting. The ratchet structure 38 includes structures which have been known in the bicycle field. Thus, they will not be described in detail here for the sake of brevity.

Figure 4:
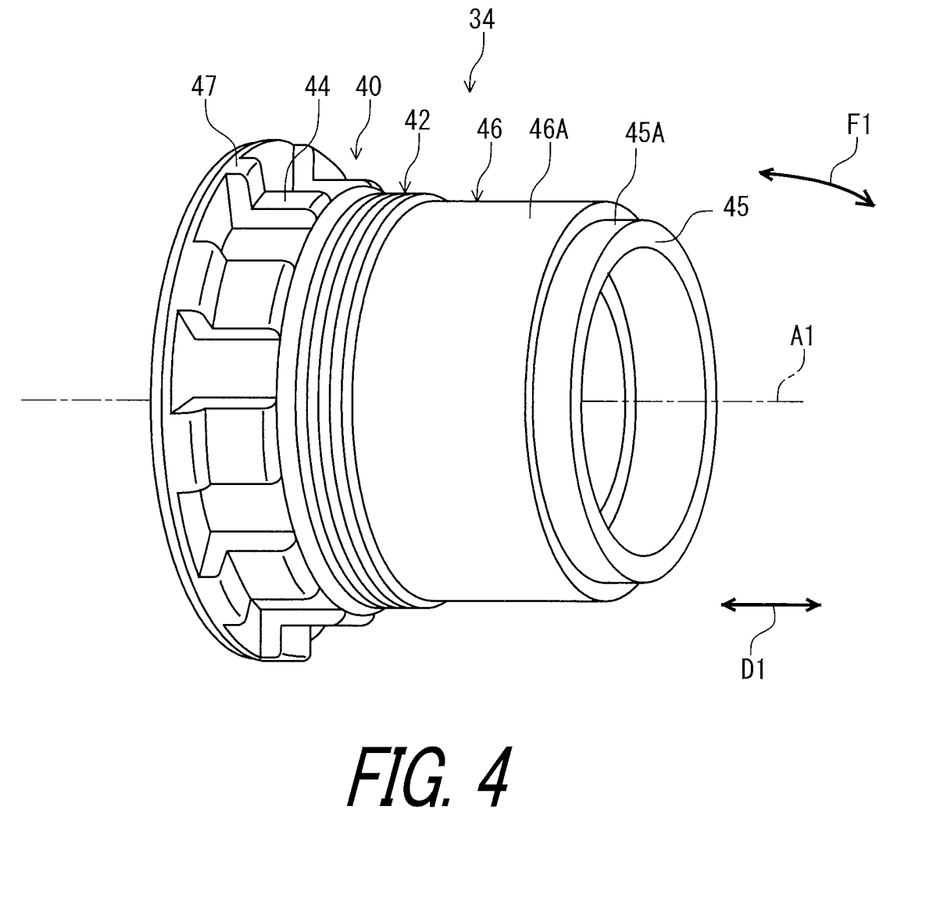
FIG. 4 is a perspective view of a sprocket support structure of the bicycle hub assembly of the bicycle drive train assembly illustrated in FIG. 1.

As seen in FIG. 4, the sprocket support structure 34 includes a first torque-transmitting profile 40 and a first externally-threaded portion 42. The first torque-transmitting profile 40 is configured to transmit a rotational force F1 between the sprocket support structure 34 and the bicycle sprocket assembly 12. As seen in FIG. 2, the first torque-transmitting profile 40 is closer to the first body end 32A than the first externally-threaded portion 42 in the axial direction D1. The first torque-transmitting profile 40 is provided between the first externally-threaded portion 42 and the first body end 32A in the axial direction D1. The first externally-threaded portion 42 is disposed axially outwardly from the first torque-transmitting profile 40 in the axial direction D1. The first torque-transmitting profile 40 is provided between the first externally-threaded portion 42 and the second body end 32B in the axial direction D1. However, the positions of the first torque-transmitting profile 40 and the first externally-threaded portion 42 are not limited to this embodiment. As seen in FIG. 3, the plurality of rolling elements 60A is radially closer to the axle inner peripheral surface 30A of the hub axle 30 than to the first torque-transmitting profile 40

As seen in FIG. 4, the sprocket support structure 34 further comprises a base part 46 having a tubular shape. The first torque-transmitting profile 40 and the first externally-threaded portion 42 are provided on an outer peripheral surface 46A of the base part 46. The sprocket support structure 34 includes a sprocket stopper 47. The first torque-transmitting profile 40 is provided between the first externally-threaded portion 42 and the sprocket stopper 47 in the axial direction D1. The sprocket support structure 34 further comprises a smaller diameter portion 45. An outer peripheral surface 45A of the smaller diameter portion 45 has an outer diameter smaller than an outer diameter of the outer peripheral surface 46A of the base part 46. In this embodiment, the smaller diameter portion 45 is farther from the sprocket stopper 47 than the base part 46 in the axial direction D1. However, the position of the smaller diameter portion 45 is not limited to this embodiment.

The first torque-transmitting profile 40 includes at least one external spline tooth 44. The at least one external spline tooth 44 is configured to engage with a sprocket spline tooth 48 of the bicycle sprocket assembly 12 (FIG. 3). In this embodiment, the first torque-transmitting profile 40 includes a plurality of external spline teeth 44. The eleventh sprocket SP11 which is the largest sprocket among the sprockets includes a plurality of sprocket spline teeth 48 (FIG. 3). However, a total number of the external spline teeth 44 is not limited to this embodiment. A total number of the sprocket spline teeth 48 is not limited to this embodiment.

Figure 5:
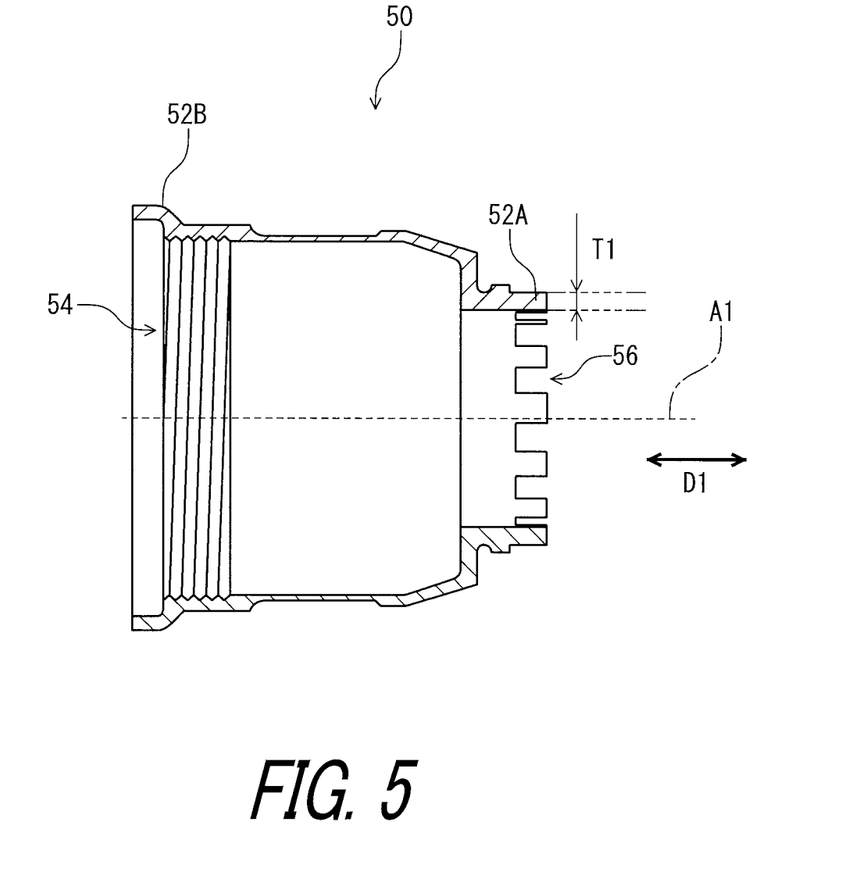
FIG. 5 is a cross-sectional view of the first lock member of the bicycle drive train assembly illustrated in FIG. 1.

As seen in FIG. 5, the first lock member 50 comprises a first axial end 52A and a second axial end 50B. The second axial end 52B is opposite to the first axial end 52A in the axial direction D1. The first lock member 50 extends between the first axial end 52A and the second axial end 52B in the axial direction D1. The first axial end 52A is farther from the first body end 32A of the hub body 32 than the second axial end 52B in the axial direction D1 in the state where the first lock member 50 is attached to the sprocket support structure 34 (FIG. 3). The first axial end 52A is farther from the first body end 32A than the second sprocket SP2 in the axial direction D1 in a state where the bicycle sprocket assembly 12 is mounted on the bicycle hub assembly 14 (FIG. 3). A thickness T1 of the first axial end 52A ranges from 0.5 mm to 1.5 mm. In this embodiment, the thickness T1 of the first axial end 52A is 1 mm. However, the thickness T1 of the first axial end 52A is not limited to this embodiment and the above range.

The first lock member 50 further comprises a first internally-threaded portion 54 and a plurality of slits 56. The first internally-threaded portion 54 is configured to threadedly engage with the first externally-threaded portion 42 of the sprocket support structure 34 (FIG. 3). The first internally-threaded portion 54 is closer to the second axial end 52B than to the first axial end 52A in the axial direction D1. However, the position of the first internally-threaded portion 54 is not limited to this embodiment. The plurality of slits 56 is provided at the first axial end 52A to engage with an attachment tool (not shown). The slit 56 extends toward the second axial end 52B in the axial direction D1. Rotation of the first lock member 50 by the attachment tool brings the first internally-threaded portion 54 into engagement with the first externally-threaded portion 42 of the sprocket support structure 34 (FIG. 3).

As seen in FIG. 3, the eleventh sprocket SP11 is provided between the first lock member 50 and the sprocket stopper 47 in the axial direction D1 in the state where the first lock member 50 is attached to the sprocket support structure 34. The first lock member 50 is rotatably coupled to the sprockets SP1 to SP11 about the rotational center axis A1. The first lock member 50 is coupled to the sprockets SP1 to SP11 to move integrally with the sprockets SP1 to SP11 in the axial direction D1. In this embodiment, the sprockets SP1 to SP10 are integrally provided with each other as a one-piece unitary member, and the sprocket SP11 is a separate member from the sprockets SP1 to SP10. However, the sprocket SP11 can be integrally provided with the sprockets SP1 to SP10 as a one-piece unitary member. Namely, the bicycle sprocket assembly 12 can be a one-piece unitary member. Furthermore, at least one of the sprockets SP1 to SP10 can be a separate member from another of the sprockets SP1 to SP10.

As seen in FIG. 2, the bicycle hub assembly 14 further comprises a second lock member 64. The second lock member 64 is configured to prevent an axial movement of the brake rotor 16 relative to the brake-rotor support structure 36 in a state where the second lock member 64 is attached to the brake-rotor support structure 36. The second lock member 64 is secured to the brake-rotor support structure 36.

As seen in FIG. 3, the axle through-bore 30B of the hub axle 30 has an axle minimum inner diameter BD1 equal to or larger than 13 mm. The axle minimum inner diameter BD1 of the axle through-bore 30B is preferably equal to or larger than 14 mm. The axle minimum inner diameter BD1 of the axle through-bore 30B is preferably equal to or smaller than 21 mm. In this embodiment, the axle minimum inner diameter BD1 of the axle through-bore 30B is 15 mm. However, the axle minimum inner diameter BD1 is not limited to this embodiment and the above ranges.

The hub axle 30 has an axle maximum outer diameter BD2 equal to or larger than 17 mm. The axle maximum outer diameter BD2 of the hub axle 30 is preferably equal to or larger than 20 mm. The axle maximum outer diameter BD2 of the hub axle 30 is preferably equal to or smaller than 23 mm. In this embodiment, the axle maximum outer diameter BD2 of the hub axle 30 is 21 mm. However, the axle maximum outer diameter BD2 of the hub axle 30 is not limited to this embodiment and the above ranges. In this embodiment, a frame contact surface 30S of the hub axle 30 has the axle maximum outer diameter BD2. The frame contact surface 30S is provided at an axial end of the hub axle 30 in the axial direction D1. The frame contact surface 30S is configured to contact the bicycle frame BF in a state where the bicycle hub assembly 14 is mounted on the bicycle frame BF. However, another portion of the hub axle 30 can have the axle maximum outer diameter BD2.

Figure 6:
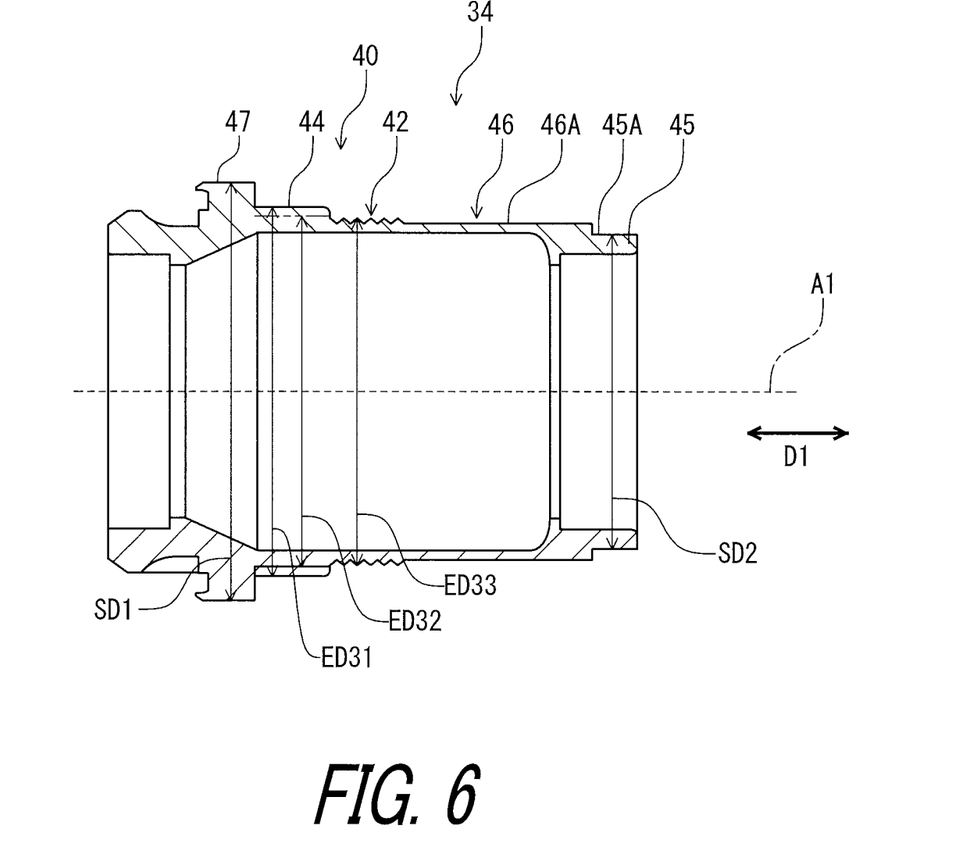
FIG. 6 is a cross-sectional view of the sprocket support structure of the bicycle hub assembly of the bicycle drive train assembly illustrated in FIG. 1.
Figure 7:
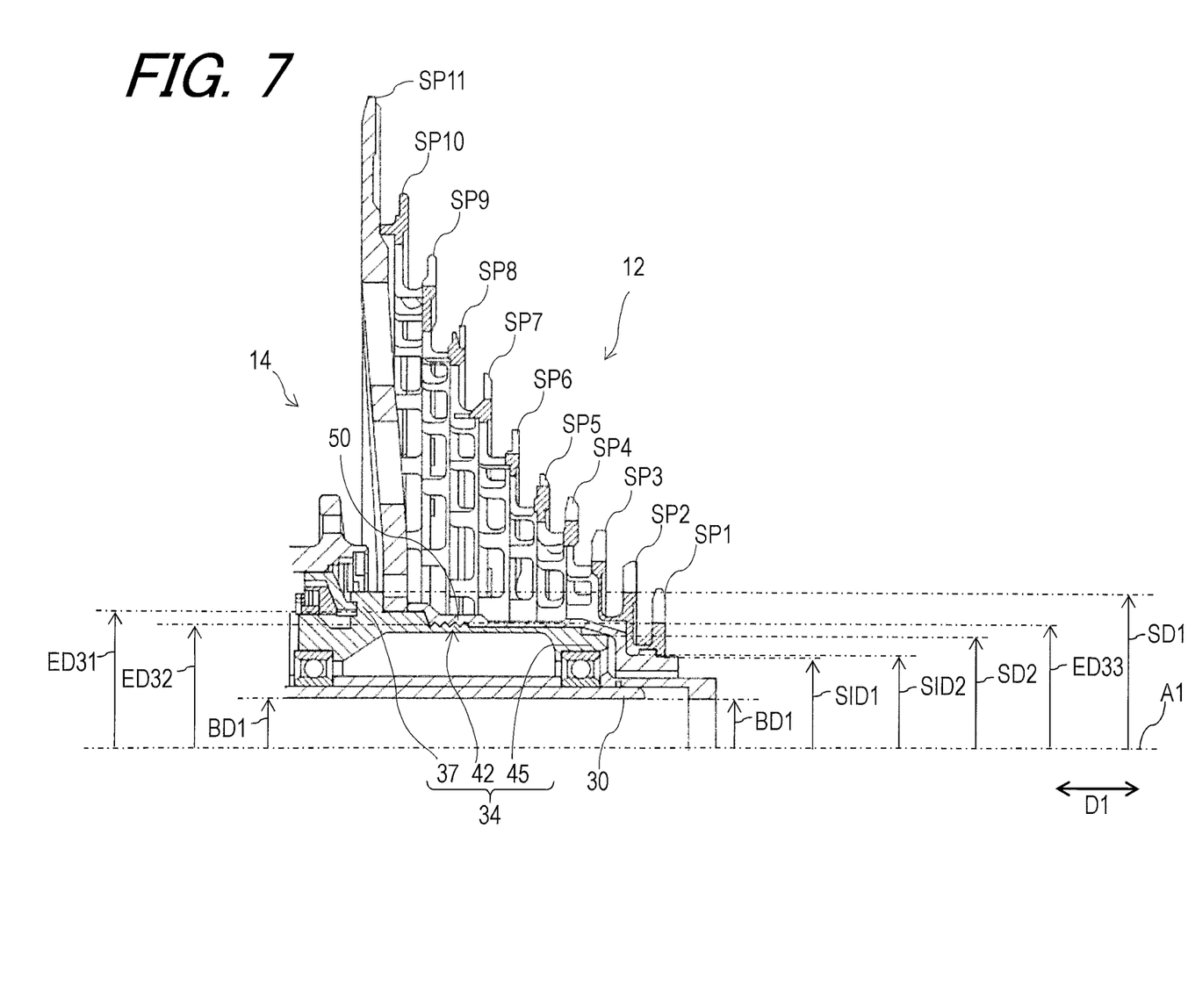
FIG. 7 is an enlarged cross-sectional view of the bicycle hub assembly, the bicycle sprocket assembly, and the first lock member of the bicycle drive train assembly illustrated in FIG. 1.

As seen in FIG. 6, the sprocket support structure 34 has a support maximum outer diameter SD1 and a support minimum outer diameter SD2. In this embodiment, the sprocket stopper 47 has the support maximum outer diameter SD1, and the smaller diameter portion 45 has the support minimum outer diameter SD2. However, the other portions of the sprocket support structure 34 can have the support maximum outer diameter SD1 and the support minimum outer diameter SD2, respectively. As seen in FIG. 7, the support minimum outer diameter SD2 is larger than the axle minimum inner diameter BD1. However, the support minimum outer diameter SD2 can be equal to or smaller than the axle minimum inner diameter BD1.

As seen in FIG. 6, the at least one external spline tooth 44 of the first torque-transmitting profile 40 has an external-spline major diameter ED31 and an external-spline minor diameter ED32. As seen in FIG. 7, the external-spline major diameter ED31 and the external-spline minor diameter ED32 are larger than the axle minimum inner diameter BD1. A difference between the external-spline major diameter ED31 and the axle minimum inner diameter BD1 of the axle through-bore 30B is equal to or smaller than 22 mm. The difference between the external-spline major diameter ED31 and the axle minimum inner diameter BD1 is preferably equal to or smaller than 21 mm. The difference between the external-spline major diameter ED31 and the axle minimum inner diameter BD1 is preferably equal to or larger than 13 mm. In this embodiment, the difference between the external-spline major diameter ED31 and the axle minimum inner diameter BD1 is 19.52 mm. However, the difference between the external-spline major diameter ED31 and the axle minimum inner diameter BD1 is not limited to this embodiment and the above ranges.

A difference between the external-spline minor diameter ED32 and the axle minimum inner diameter BD1 is equal to or smaller than 20 mm. The difference between the external-spline minor diameter ED32 and the axle minimum inner diameter BD1 is preferably equal to or smaller than 19 mm. The difference between the external-spline minor diameter ED32 and the axle minimum inner diameter BD1 is preferably equal to or larger than 12 mm. In this embodiment, the difference between the external-spline minor diameter ED32 and the axle minimum inner diameter BD1 is 17.2 mm. However, the difference between the external-spline minor diameter ED32 and the axle minimum inner diameter BD1 is not limited to this embodiment and the above ranges.

As seen in FIG. 6, the first externally-threaded portion 42 has a first externally-threaded major diameter ED33. As seen in FIG. 7, the first externally-threaded major diameter ED33 is larger than the axle minimum inner diameter BD1. A difference between the first externally-threaded major diameter ED33 and the axle minimum inner diameter BD1 is equal to or smaller than 19 mm. The difference between the first externally-threaded major diameter ED33 and the axle minimum inner diameter BD1 is preferably equal to or smaller than 18 mm. The difference between the first externally-threaded major diameter ED33 and the axle minimum inner diameter BD1 is more preferably equal to or larger than 11 mm. In this embodiment, the difference between the first externally-threaded major diameter ED33 and the axle minimum inner diameter BD1 is equal to 17 mm. However, the difference between the first externally-threaded major diameter ED33 and the axle minimum inner diameter BD1 is not limited to this embodiment and the above ranges.

As seen in FIG. 7, a difference between the support minimum outer diameter SD2 and the axle minimum inner diameter BD1 is equal to or smaller than 15 mm. The difference between the support minimum outer diameter SD2 and the axle minimum inner diameter BD1 is preferably equal to or smaller than 14 mm. The difference between the support minimum outer diameter SD2 and the axle minimum inner diameter BD1 is preferably equal to or larger than 7 mm. In this embodiment, the difference between the support minimum outer diameter SD2 and the axle minimum inner diameter BD1 is 13 mm. However, the difference between the support minimum outer diameter SD2 and the axle minimum inner diameter BD1 is not limited to this embodiment and the above ranges.

Figure 8:
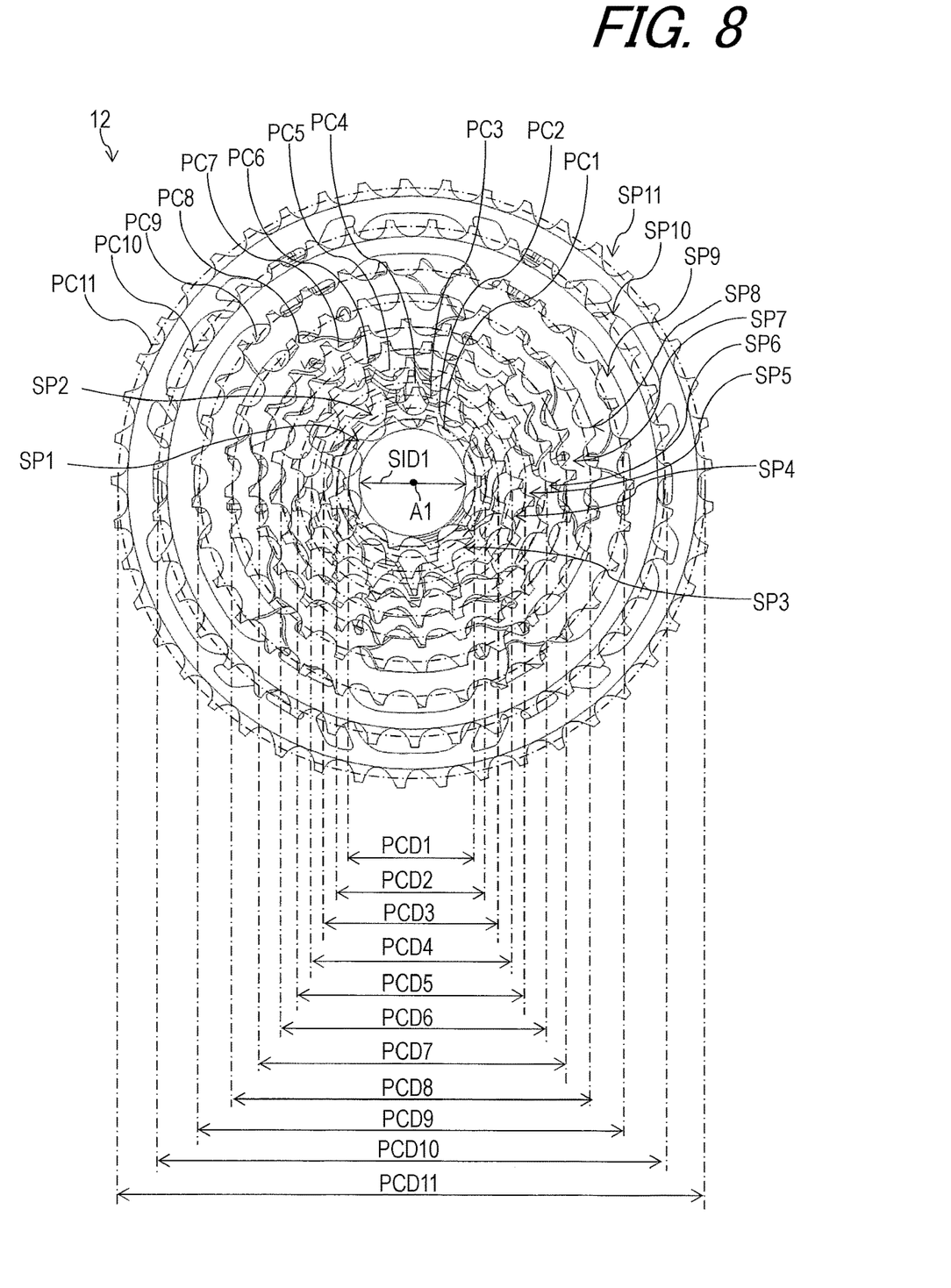
FIG. 8 is a side elevational view of the bicycle sprocket assembly of the bicycle drive train assembly illustrated in FIG. 1.

As seen in FIG. 8, the first sprocket SP1 has a first pitch-circle diameter PCD1. The second sprocket SP2 has a second pitch-circle diameter PCD2. The third sprocket SP3 has a third pitch-circle diameter PCD3. The fourth sprocket SP4 has a fourth pitch-circle diameter PCD4. The fifth sprocket SP5 has a fifth pitch-circle diameter PCD5. The sixth sprocket SP6 has a sixth pitch-circle diameter PCD6. The seventh sprocket SP7 has a seventh pitch-circle diameter PCD7. The eighth sprocket SP8 has an eighth pitch-circle diameter PCD8. The ninth sprocket SP9 has a ninth pitch-circle diameter PCD9. The tenth sprocket SP10 has a tenth pitch-circle diameter PCD10. The eleventh sprocket SP11 has an eleventh pitch-circle diameter PCD11. In this embodiment, the first pitch-circle diameter PCD1 of the first sprocket SP1 is the smallest pitch-circle diameter among the sprockets SP1 to SP11. However, the first pitch-circle diameter PCD1 of the first sprocket SP1 can be larger than the smallest pitch-circle diameter.

The first sprocket SP1 has a first pitch circle PC1 having the first pitch-circle diameter PCD1. The second sprocket SP2 has a second pitch circle PC2 having the second pitch-circle diameter PCD2. The third sprocket SP3 has a third pitch circle PC3 having the third pitch-circle diameter PCD3. The fourth sprocket SP4 has a fourth pitch circle PC4 having the fourth pitch-circle diameter PCD4. The fifth sprocket SP5 has a fifth pitch circle PC5 having the fifth pitch-circle diameter PCD5. The sixth sprocket SP6 has a sixth pitch circle PC6 having the sixth pitch-circle diameter PCD6. The seventh sprocket SP7 has a seventh pitch circle PC7 having the seventh pitch-circle diameter PCD7. The eighth sprocket SP8 has an eighth pitch circle PC8 having the eighth pitch-circle diameter PCD8. The ninth sprocket SP9 has a ninth pitch circle PC9 having the ninth pitch-circle diameter PCD9. The tenth sprocket SP10 has a tenth pitch circle PC10 having the tenth pitch-circle diameter PCD10. The eleventh sprocket SP11 has an eleventh pitch circle PC11 having the eleventh pitch-circle diameter PCD11.

The first pitch circle PC1 of the first sprocket SP1 is defined by center axes of pins of the bicycle chain 20 (FIG. 1) engaged with the first sprocket SP1. The second to eleventh pitch circles PC2 to PC11 are defined as well as the first pitch circle PC1. Thus, they will not be descried in detail here for the sake of brevity.

The first to eleventh sprockets SP1 to SP11 have inner diameters, respectively. Specifically, as seen in FIG. 7, the first sprocket SP1 has a first inner diameter SID1. The second sprocket SP2 has a second inner diameter SID2. The first inner diameter SID1 is the smallest diameter among the inner diameters of the sprockets SP1 to SP11. The second inner diameter SPD2 is the second smallest diameter among the inner diameters of the sprockets SP1 to SP11. In this embodiment, the first inner diameter SID1 of the first sprocket SP1 is smaller than the support maximum outer diameter SD1. The first inner diameter SID1 is smaller than the support minimum outer diameter SD2. However, the first inner diameter SID1 of the first sprocket SP1 can be equal to or larger than the support maximum outer diameter SD1. The first inner diameter SID1 can be equal to or larger than the support minimum outer diameter SD2.

Similarly, the second inner diameter SID2 of the second sprocket SP2 is smaller than the support maximum outer diameter SD1. The second inner diameter SID2 is smaller than the support minimum outer diameter SD2. However, the second inner diameter SID2 of the second sprocket SP2 can be equal to or larger than the support maximum outer diameter SD1. The second inner diameter SID2 can be equal to or larger than the support minimum outer diameter SD2.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle hub assembly comprising:
a hub axle including an axle through-bore that has an axle minimum inner diameter equal to or larger than 13 mm;
a hub body rotatably supported on the hub axle about a rotational center axis of the bicycle hub assembly, the hub body having a first body end and a second body end opposite to the first body end in an axial direction with respect to the rotational center axis; and
a sprocket support structure rotatably mounted on the hub axle about the rotational center axis of the bicycle hub assembly, the sprocket support structure including:
a first torque-transmitting profile configured to transmit a rotational force between the sprocket support structure and a bicycle sprocket assembly; and
a first externally-threaded portion configured to threadedly engage with a first internally-threaded portion of a first lock member, the first torque-transmitting profile being closer to the first body end than the first externally-threaded portion in the axial direction, wherein the axle minimum inner diameter of the axle through-bore is equal to or smaller than 21 mm, the first torque-transmitting profile includes at least one external spline tooth configured to engage with an internal spline tooth of the bicycle sprocket assembly, the at least one external spline tooth has an external-spline major diameter that is larger than the axle minimum inner diameter of the axle through-bore, and a difference between the external-spline major diameter and the axle minimum inner diameter is equal to or smaller than 22 mm and is equal to or larger than 13 mm.

2. The bicycle hub assembly according to claim 1, wherein
the difference between the external-spline major diameter and the axle minimum inner diameter is equal to or smaller than 21 mm.

3. The bicycle hub assembly according to claim 1, wherein
the first torque-transmitting profile includes at least one external spline tooth configured to engage with an internal spline tooth of the bicycle sprocket assembly,
the at least one external spline tooth has an external-spline minor diameter that is larger than the axle minimum inner diameter of the axle through-bore, and
a difference between the external-spline minor diameter and the axle minimum inner diameter is equal to or smaller than 20 mm.

4. The bicycle hub assembly according to claim 3, wherein
the difference between the external-spline minor diameter and the axle minimum inner diameter is equal to or smaller than 19 mm.

5. The bicycle hub assembly according to claim 3, wherein
the difference between the external-spline minor diameter and the axle minimum inner diameter is equal to or larger than 12 mm.

6. The bicycle hub assembly according to claim 1, wherein
the first externally-threaded portion has a first externally-threaded major diameter that is larger than the axle minimum inner diameter, and
a difference between the first externally-threaded major diameter and the axle minimum inner diameter is equal to or smaller than 19 mm.

7. The bicycle hub assembly according to claim 6, wherein
the difference between the first externally-threaded major diameter and the axle minimum inner diameter is equal to or smaller than 18 mm.

8. The bicycle hub assembly according to claim 6, wherein
the difference between the first externally-threaded major diameter and the axle minimum inner diameter is equal to or larger than 11 mm.

9. The bicycle hub assembly according to claim 1, wherein
the sprocket support structure has a support minimum outer diameter that is larger than the axle minimum inner diameter of the axle through-bore, and
a difference between the support minimum outer diameter and the axle minimum inner diameter is equal to or smaller than 15 mm.

10. The bicycle hub assembly according to claim 9, wherein
the difference between the support minimum outer diameter and the axle minimum inner diameter is equal to or smaller than 14 mm.

11. The bicycle hub assembly according to claim 9, wherein
the difference between the support minimum outer diameter and the axle minimum inner diameter is equal to or larger than 7 mm.

12. The bicycle hub assembly according to claim 1, further comprising
a bearing provided between the sprocket support structure and the hub axle to support rotatably the sprocket support structure relative to the hub axle.

13. The bicycle hub assembly according to claim 12, wherein
the hub axle includes an axle inner peripheral surface defining the axle through-bore,
the bearing includes a plurality of rolling elements, and
the plurality of rolling elements is radially closer to the axle inner peripheral surface than to the first torque-transmitting profile.

14. The bicycle rear hub assembly according to claim 1, wherein
the axle minimum inner diameter of the axle through-bore is equal to or larger than 14 mm.

15. The bicycle rear hub assembly according to claim 1, wherein
the hub axle has an axle maximum outer diameter equal to or larger than 17 mm.

16. The bicycle rear hub assembly according to claim 15, wherein
the axle maximum outer diameter of the hub axle is equal to or larger than 20 mm.

17. The bicycle rear hub assembly according to claim 15, wherein
the axle maximum outer diameter of the hub axle is equal to or smaller than 23 mm.

18. A bicycle drive train assembly comprising:
the bicycle hub assembly according to claim 1, the sprocket support structure having a support maximum outer diameter; and
the bicycle sprocket assembly including a first sprocket that has a first inner diameter smaller than the support maximum outer diameter of the sprocket support structure.

19. The bicycle drive train assembly according to claim 18, wherein
the sprocket support structure has a support minimum outer diameter, and
the first inner diameter of the first sprocket is smaller than the support minimum outer diameter.

20. The bicycle drive train assembly according to claim 18, wherein
the bicycle sprocket assembly comprises a plurality of sprockets including the first sprocket,
the first sprocket has a first pitch-circle diameter, and
the first pitch-circle diameter is the smallest pitch-circle diameter among the plurality of sprockets.

21. The bicycle drive train assembly according to claim 18, further comprising
the first lock member configured to prevent an axial movement of the bicycle sprocket assembly relative to the sprocket support structure in a state where the first lock member is attached to the sprocket support structure, the first lock member including the first internally-threaded portion to engage with the first externally-threaded portion.

22. The bicycle drive train assembly according to claim 21, wherein
the first lock member has a first axial end and a second axial end and extends between the first axial end and the second axial end in the axial direction,
the first internally-threaded portion is provided between the first axial end and the first torque-transmitting profile in a state where the first internally-threaded portion is engaged with the first externally-threaded portion, and
a thickness of the first axial end ranges from 0.5 mm to 1.5 mm.

23. The bicycle rear hub assembly according to claim 1, wherein the sprocket support structure further includes:
a sprocket stopper having a first radially-extending surface configured to axially abut the bicycle sprocket assembly in the axial direction, the first torque-transmitting profile being provided between the first externally-threaded portion and the sprocket stopper in the axial direction, the sprocket stopper having a second radially-extending surface facing opposite to the first radially-extending surface in the axial direction, the sprocket stopper having a projection at an outer circumferential end, the projection protruding from the second radially-extending surface in the axial direction away from the bicycle sprocket assembly.

* * * * *